United States Patent
Howitt

(10) Patent No.: US 11,396,796 B2
(45) Date of Patent: Jul. 26, 2022

(54) SOLUBILITY-BASED WELLBORE REMOVAL OPERATIONS

(71) Applicant: Halliburton Energy Services, Inc., Houston, TX (US)

(72) Inventor: Garry Martin Howitt, Aberdeen (GB)

(73) Assignee: Halliburton Energy Services, Inc., Houston, TX (US)

( * ) Notice: Subject to any disclaimer, the term of this patent is extended or adjusted under 35 U.S.C. 154(b) by 54 days.

(21) Appl. No.: 16/500,330

(22) PCT Filed: Dec. 28, 2018

(86) PCT No.: PCT/US2018/067940
§ 371 (c)(1),
(2) Date: Oct. 2, 2019

(87) PCT Pub. No.: WO2020/139382
PCT Pub. Date: Jul. 2, 2020

(65) Prior Publication Data
US 2021/0215040 A1    Jul. 15, 2021

(51) Int. Cl.
*E21B 43/114*    (2006.01)
*C09K 3/14*    (2006.01)
(Continued)

(52) U.S. Cl.
CPC .......... *E21B 43/114* (2013.01); *C09K 3/1409* (2013.01); *C09K 8/032* (2013.01); *E21B 49/0875* (2020.05); *E21B 2200/08* (2020.05)

(58) Field of Classification Search
CPC .......... E21B 43/114; E21B 7/18; E21B 7/185; E21B 41/0078
See application file for complete search history.

(56) References Cited

U.S. PATENT DOCUMENTS 5,366,015 A * 11/1994 Surjaatmadja .......... B24C 1/003
166/298
9,322,231 B2    4/2016 Jamison et al.
(Continued)

FOREIGN PATENT DOCUMENTS

WO    2017164878 A1    9/2017

OTHER PUBLICATIONS

PCT Application Serial No. PCT/US2018/067940, International Search Report, dated Sep. 19, 2019, 4 pages.
(Continued)

*Primary Examiner* — Robert E Fuller
(74) *Attorney, Agent, or Firm* — DeLizio, Peacock, Lewin & Guerra

(57) ABSTRACT

A soluble abrasive cutting tool is configured to perform a cutting operation in a wellbore. The cutting operation comprising directing a pressurized stream of an abrasive fluid containing abrasive particles at a surface in the wellbore. For example, a stream of abrasive particles can be directed via a nozzle on the cutting tool at casing in the wellbore to perforate the casing. The abrasive particles are selected to dissolve in the wellbore fluid after the cutting operations have been completed. Once dissolved, the wellbore fluid can be removed from the area of the cutting operations without clogging tubing or pumps used to remove the wellbore fluid.

17 Claims, 6 Drawing Sheets

(51) Int. Cl.
    *C09K 8/03*    (2006.01)
    *E21B 49/08*   (2006.01)

(56) References Cited

U.S. PATENT DOCUMENTS

| | | | |
|---|---|---|---|
| 9,840,896 B2* | 12/2017 | Britton | C09K 8/426 |
| 2005/0183741 A1* | 8/2005 | Surjaatmadja | E21B 43/26 |
| | | | 134/6 |
| 2007/0251692 A1 | 11/2007 | Billingham | |
| 2015/0144341 A1 | 5/2015 | Mayer et al. | |
| 2015/0337634 A1 | 11/2015 | O'Leary et al. | |
| 2016/0017699 A1* | 1/2016 | Watson | E21B 29/00 |
| | | | 166/298 |

OTHER PUBLICATIONS

PCT Application Serial No. PCT/US2018/067940, International Written Opinion, dated Sep. 19, 2019, 6 pages.

* cited by examiner

SOLUBILITY-BASED WELLBORE REMOVAL OPERATIONS

BACKGROUND

The disclosure generally relates to the field of wellbore operations and more particularly to performing operations in a wellbore utilizing dissolvable abrasive particles, These operations can be cutting, cleaning or general material removal.

It is often desirable to perform operations in wellbores. For example, it may be desirable to cut perforations in a casing in a wellbore to allow production fluids (e.g., hydrocarbons) to flow into the casing so that they can be pumped to the surface. In other instances, it may be desirable to cut through casing or material as part of a well abandonment procedure. Explosive charges have been designed and are often utilized to perform these operations. The explosive charge is selected, lowered to the desired depth, and then set off. The resulting explosion can cause the casing to be perforated or cut depending on the type and design of the explosive charge.

However, the use of explosive charges to perform operations in a wellbore can pose operational and logistical problems. Debris from the explosive charge can remain in the wellbore after the charge is set off. This debris can clog the tubing and pumps used in wellbore operations. Further, the use of, and transportation of, explosive charges in a jurisdiction may be heavily regulated. As a result, there can be significant licensing, inspection, and other regulatory costs associated with transporting and using explosive charges. Further, highly trained personnel may be required to select and position the explosive charge in a wellbore.

BRIEF DESCRIPTION OF THE DRAWINGS

Embodiments and aspects of the disclosure may be better understood by referencing the accompanying drawings.

DESCRIPTION OF EMBODIMENTS

The description that follows includes example systems, methods, techniques, and program flows that embody aspects of the disclosure. However, it is understood that this disclosure may be practiced without these specific details. For instance, this disclosure provides illustrative examples of operations performed using a soluble abrasive cutting tool submerged in wellbore fluids within a wellbore. Aspects of this disclosure can be also applied to other environments in which cutting operations are performed within a fluid. In other instances, well-known protocols, structures and techniques have not been shown in detail in order not to obfuscate the description.

Overview

A soluble abrasive cutting tool is configured to perform a cutting operation in a wellbore. The cutting operation can include directing a pressurized stream of an abrasive fluid containing abrasive particles in the wellbore. For example, a stream of abrasive particles can be directed via a nozzle on the cutting tool at a casing in the wellbore to perforate, cut or clean the casing. The abrasive particles are selected to dissolve in the wellbore fluid after the cutting operations have been completed. Once dissolved, the wellbore fluid can be removed from the area of the cutting operations without clogging tubing or pumps used to remove the wellbore fluid.

Example Illustrations

Figure 1:
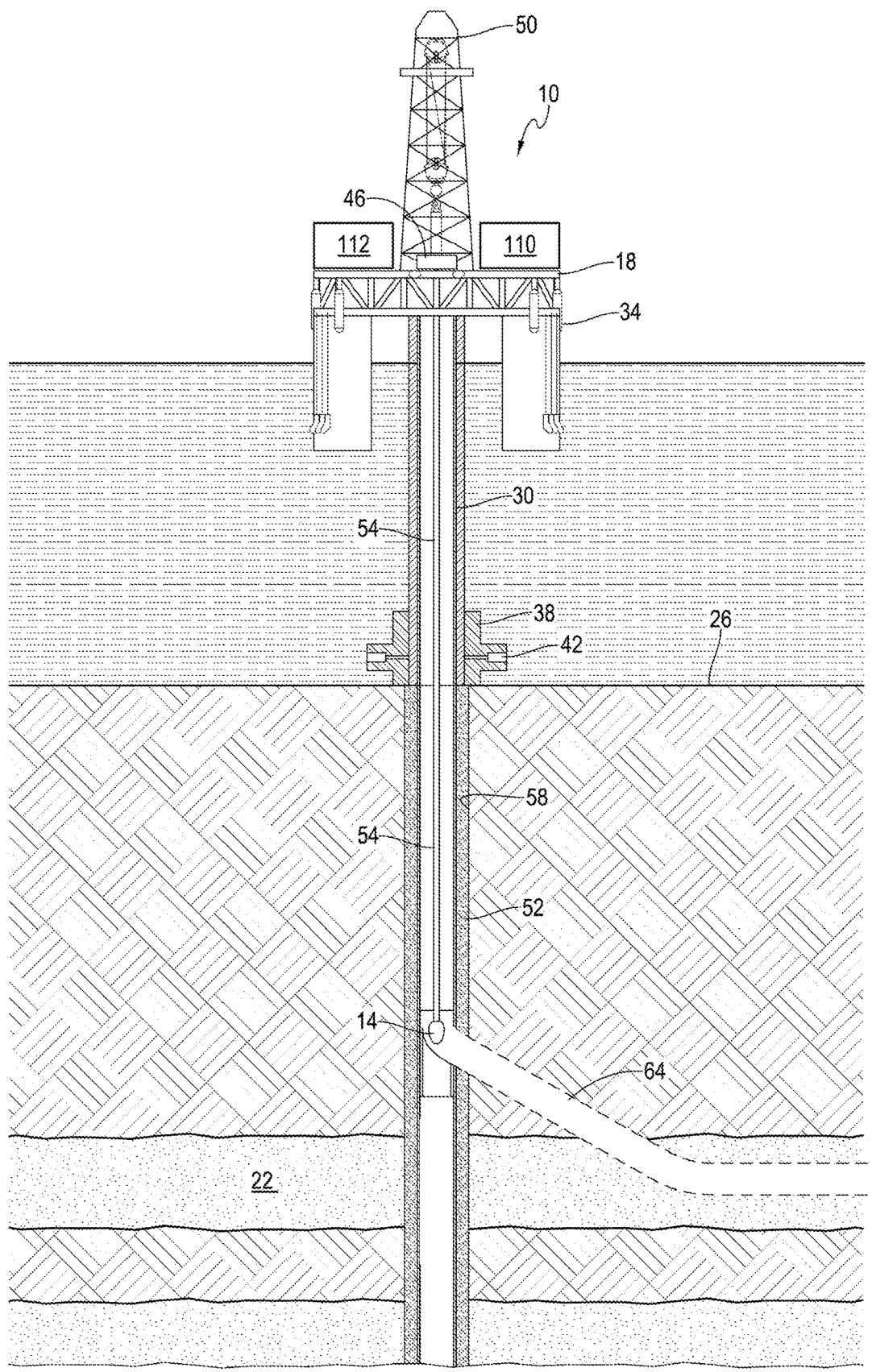
FIG. 1 is a diagram illustrating an offshore oil and gas platform in which the cutting systems and methods of the embodiments described herein can be utilized.

FIG. 1 is a diagram illustrating an offshore oil and gas platform 10 in which the abrasive systems and methods of the embodiments described herein can be utilized. The platform 10 may be a semi-submersible platform 18 centered over a submerged oil and gas formation 22 located below the sea floor 26. A subsea conduit 30 extends from the deck 34 of the platform 18 to a wellhead installation 38 including one or more blowout preventers 42. The platform 18 has a hoisting apparatus 46 and a derrick 50 for raising and lowering work strings 54. A work string 54 can be a casing string, a drill string, or other strings that may be lowered and raised within a wellbore 58. As depicted, wellbore 58 has been drilled through the various earth strata, including the formation 22. A casing 52 is at least partially cemented within the wellbore 58. The term "casing" is used herein to designate a tubular string used to line a wellbore. Casing 52 may actually be of the type known to those skilled in the art as "liner" and may be made of any material, such as steel or composite material and may be segmented or continuous, such as coiled tubing. A soluble abrasive cutting tool 14 forms part of the work string 54 and is positioned along the casing 52 at a location where it is desired to perform cutting operations. The soluble abrasive cutting tool 14 may be coupled to one or more pumps 112 that can pump abrasive fluids (e.g., fluids containing abrasive particles) through the soluble abrasive cutting tool 14. A control system 110 can control aspects of the operations performed by the soluble abrasive cutting tool 14. For example, the control system 110 can control the depth at which the soluble abrasive cutting tool 14 is deployed within the wellbore 58, a pressure at which the abrasive fluid is pumped through the soluble abrasive cutting tool 14, a rotation, tilt or other positional aspect of the soluble abrasive cutting tool 14, which nozzle or nozzles of the tool are to be utilized, etc.

While FIG. 1 depicts an offshore oil and gas platform 10, it will be appreciated by those skilled in the art that the soluble abrasive cutting tool 14, and its alternative embodiments disclosed herein, are equally well suited for use in or on other types of oil and gas rigs, such as land-based oil and gas rigs or any other location.

Figure 2:
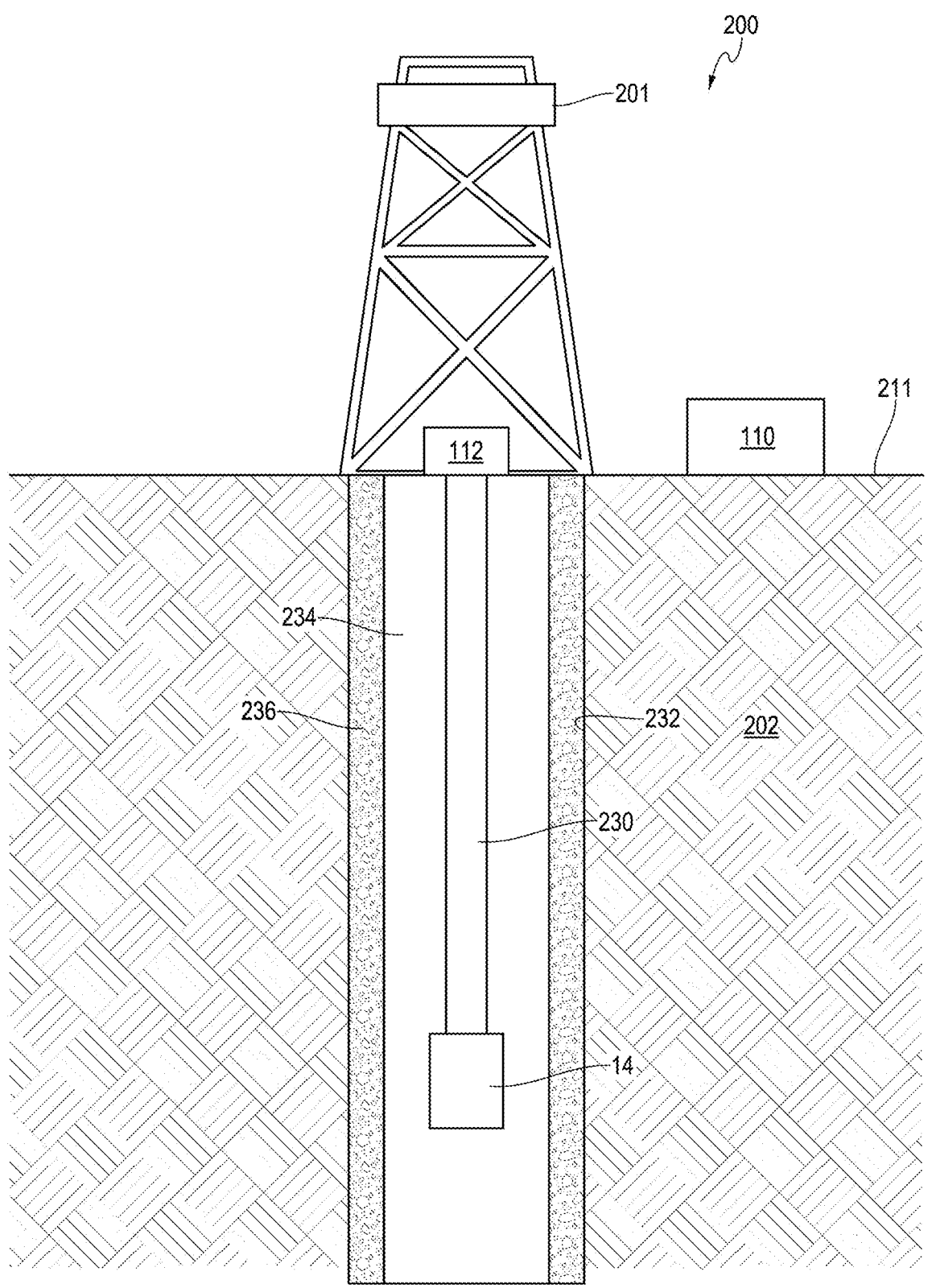
FIG. 2 is a diagram illustrating a land-based oil and gas platform in which the cutting systems and methods of the embodiments described herein can be utilized.

FIG. 2 is a diagram illustrating a land-based oil and gas platform in which the cutting systems and methods of the embodiments described herein can be utilized. Referring to FIG. 2, a subsurface cutting system 200 operating from a land-based oil and gas platform is illustrated. A platform 201 is centered over an oil and gas formation 214 located within the subsurface 202. A wellbore 232 extends through the various earth strata including the oil and gas formation 214. A casing 234 is cemented within wellbore 232 by cement 236. Work string 230 can include various tools including soluble abrasive cutting tool 14. When it is desired to perforate the oil and gas formation 214, the work string 230 is lowered through casing 234 until the soluble abrasive cutting tool 14 is positioned at the desired location. The soluble abrasive cutting tool 14 may be coupled to one or more pumps 112 that can pump abrasive fluids (e.g., fluids containing abrasive particles) through the abrasive cutting tool 14. A control system 210 either on the surface 211 or on the work string 230 can include a processor and can have a non-transitory machine-readable medium storing program code to control aspects of the operation of the soluble abrasive cutting tool 14. For example, the control system 110 can control the depth at which the abrasive cutting tool 14 is deployed within the wellbore 232, a pressure at which the abrasive fluid is pumped through the abrasive cutting tool 14, a rotation, tilt or other positional aspect of the abrasive cutting tool 14, the nozzle or nozzles of the tool that are to be utilized, etc.

Even though FIGS. 1 and 2 depict vertical wells, it should be noted that the soluble abrasive cutting tool 14 and associated methods described herein are equally well-suited for use in deviated wells, inclined wells or horizontal wells (e.g., inclined wellbore 64 shown in FIG. 1).

Figure 3B:
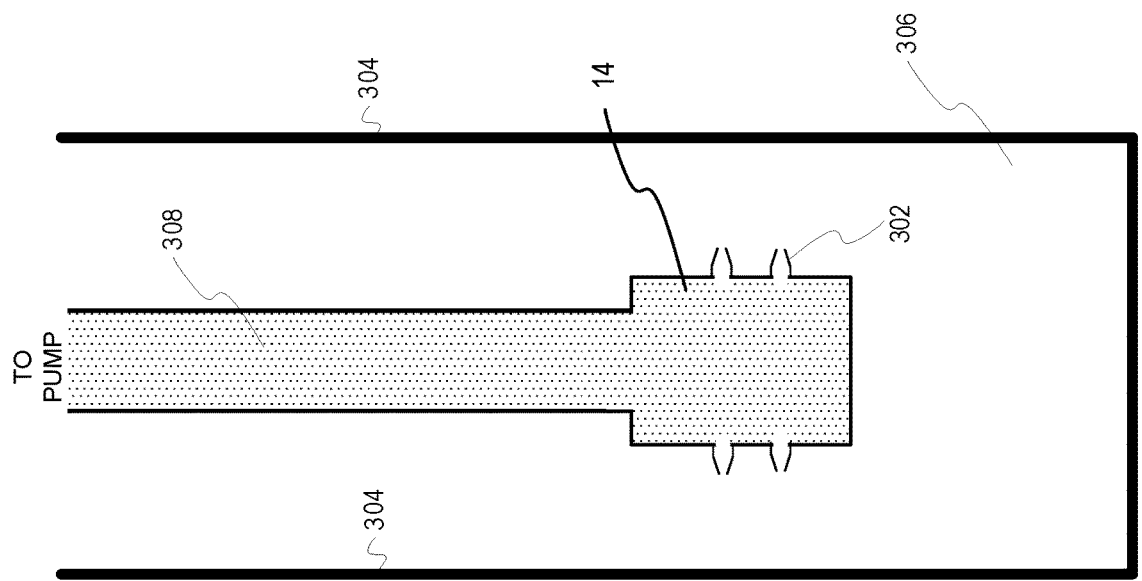
FIGS. 3A and 3B illustrate a soluble abrasive cutting tool in a wellbore prior to cutting operations utilizing dissolvable granulated abrasive particles according to embodiments.
Figure 3A:
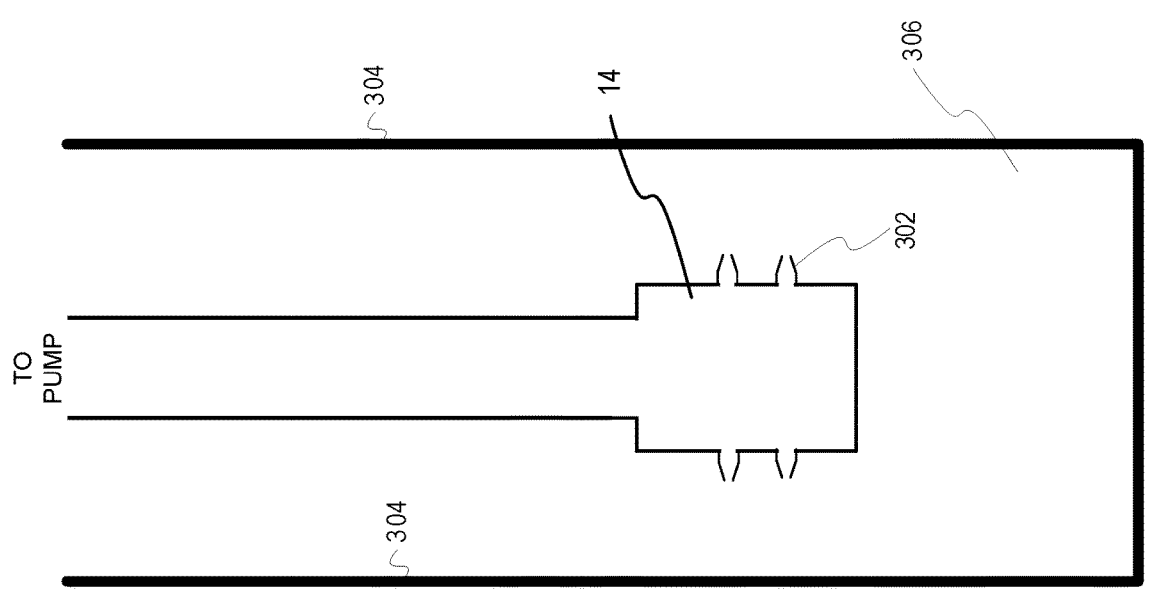

FIGS. 3A and 3B illustrate a soluble abrasive cutting tool in a wellbore prior to cutting operations utilizing dissolvable granulated abrasive particles according to embodiments. FIG. 3A illustrates a soluble abrasive cutting tool 14 deployed in a wellbore having a wellbore surface 304. Wellbore surface 304 can be the surface of a casing (e.g., casing 52, 434), the surface of a formation (e.g., formation 22, 414), or another surface within a wellbore. A sump 306 is formed at the bottom of the wellbore. Wellbore fluids may be present in the wellbore, including sump 306. Examples of such wellbore fluids can include drilling fluids, completion fluids, production fluids (hydrocarbons), formation fluids, etc. Soluble abrasive cutting tool 14 can include one or more nozzles 302. The one or more nozzles 302 can be disposed on the tool 14 in a pattern that is to match a pattern to be cut into the wellbore surface 304. For example, the nozzles may be disposed in a pattern designed to cut perforation holes in a casing. The nozzles 302 can be designed to provide a focused jet of an abrasive fluid when passed through the nozzles under pressure. Although FIGS. 3A, 3B, 4A and 4B illustrate a soluble abrasive cutting tool 14 that has four nozzles 302, those of skill in the art having the benefit of the disclosure will appreciate that the tool 14 could have fewer nozzles 302 or more nozzles 302 than those shown in the figures.

FIG. 3B illustrates a soluble abrasive cutting tool 14 deployed in a wellbore where the tool has been prepared for use by adding an abrasive fluid 308 to the tool 14. The abrasive fluid 308 can comprise a carrier fluid (or gel) mixed with abrasive particles. Various types of abrasive particles may be selected for use. The abrasive particles may be selected based on the particle's solubility in the particular wellbore fluid currently in the wellbore and the particle's relative insolubility (or low solubility) in the carrier fluid or gel. In some embodiments, the abrasive particles comprise particles of a metallic magnesium alloy.

Figure 4B:
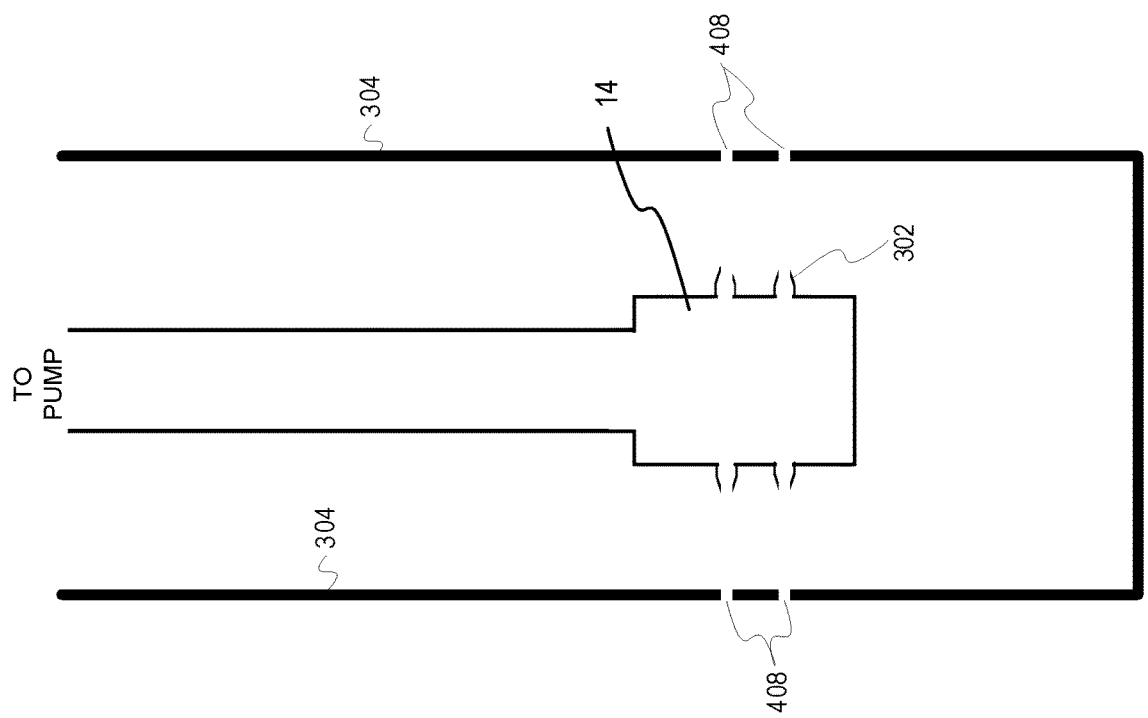
FIGS. 4A and 4B illustrate a soluble abrasive cutting tool in a wellbore during a cutting operation utilizing soluble abrasive particles and after the cutting operation.
Figure 4A:
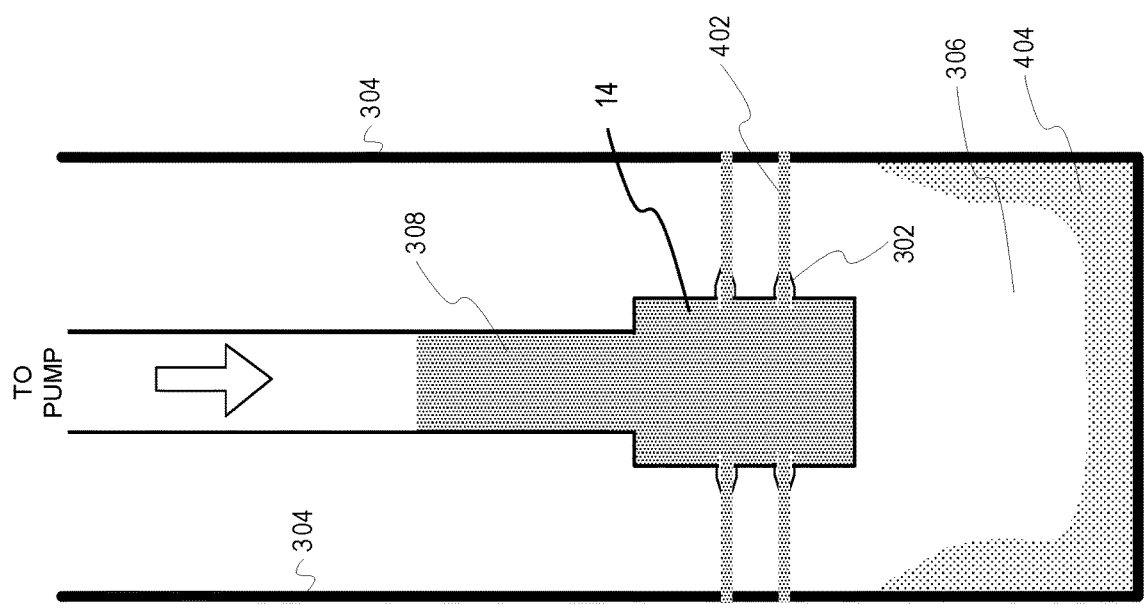

FIGS. 4A and 4B illustrate a soluble abrasive cutting tool in a wellbore during a cutting operation utilizing soluble abrasive particles and after the cutting operation. FIG. 4A illustrates a soluble abrasive cutting tool 14 during a cutting operation. A pump coupled to the soluble abrasive cutting tool 14 pumps abrasive fluid 308 through the nozzles 302 to produce a focused pressurized stream 402 of abrasive fluid 308 that strikes the wellbore surface 304. As the abrasive particles strike the wellbore surface 304 a portion of the surface can be removed. Remnants 404 of the abrasive particles can fall into the sump 306, where they can begin to dissolve in the wellbore fluid.

FIG. 4B illustrates a soluble abrasive cutting tool 14 and wellbore after a cutting operation. FIG. 4B shows perforations 408 that have been cut into the wellbore surface 304 using the pressurized stream of soluble abrasive particles. The remnants 404 of the soluble abrasive particles shown in FIG. 4A have dissolved in the wellbore fluid. The fluids in the wellbore can thus be pumped out without clogging tubing and pumps used in the wellbore.

Figure 5:
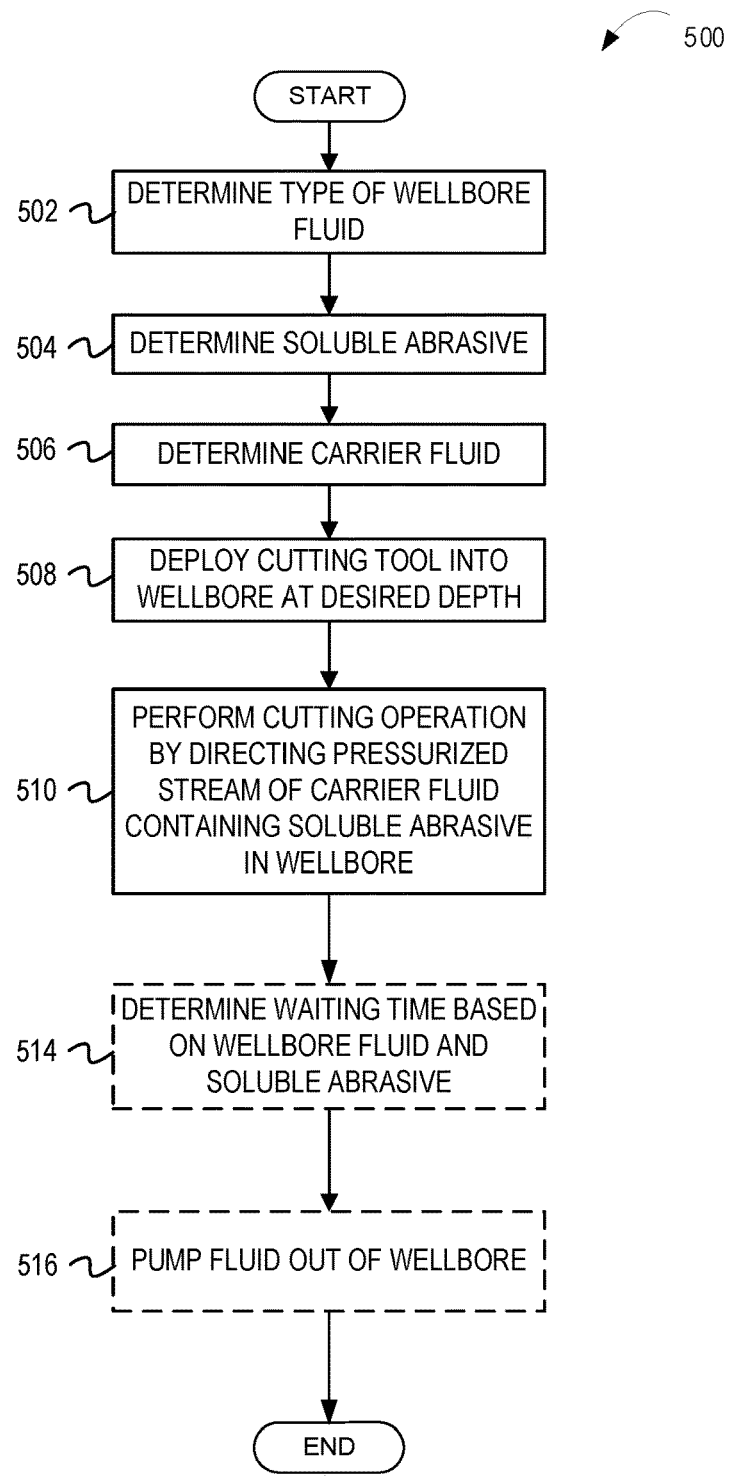
FIG. 5 is a flowchart illustrating operations of a method for cutting in a wellbore utilizing dissolvable granulated abrasive particles according to embodiments.

FIG. 5 is a flowchart illustrating operations of a method for cutting a wellbore surface utilizing dissolvable granulated abrasive particles according to embodiments.

At block 502, a type of wellbore fluid in a wellbore is determined. The type of wellbore fluid may be determined in various ways. For example, the type of wellbore fluid may be determined by sampling fluid from the wellbore that has recently been extracted from the wellbore. Alternatively, the type of wellbore fluid may be determined based on a fluid that has been recently pumped into the wellbore (e.g., fracking fluids, completion fluids, drilling fluids etc.)

At block 504, a soluble abrasive is determined. The soluble abrasive can be determined based on the type of wellbore fluid in the wellbore. As an example, a magnesium alloy may be selected as the soluble abrasive for a wellbore fluid comprising a saltwater brine. Various types of salts may also be selected as an abrasive particle. In some aspects, the choice of a particular soluble abrasive can be based on multiple factors. For example, the choice of a particular soluble abrasive can be based on the solubility of the abrasive in the wellbore fluid, the temperature of the wellbore fluid at a desired cutting location in the wellbore, the pressure of the wellbore fluid at the desired cutting location, and the type of material to be removed (casing, rock formation, composite materials, glass fiber, etc.).

Additionally, a size of the abrasive particles for the soluble abrasive may be selected. The size may be selected based on the cutting operations to be performed. For example, large particles (e.g., up to quarter inch) may be selected if more aggressive cutting or removal action is desired, whereas a smaller particle size (e.g., thousandths of an inch) may be selected if more precise cutting or removal action is desired.

At block 506, a carrier fluid is determined. The carrier fluid can be determined based on the soluble abrasive selected at block 504. For example, it is desirable to select a carrier fluid in which the soluble abrasive is insoluble, or has a low solubility, with respect to the carrier fluid. Further, it is desirable to select a carrier fluid that does not cause adverse reactions with the wellbore fluid at the desired cutting location. Further factors that can affect the choice of carrier fluid can include the temperature and pressure at the desired cutting location in the wellbore.

At block 508, the soluble abrasive cutting tool is deployed into the wellbore to a desired cutting location.

At block 510, a cutting operation is performed by the soluble abrasive cutting tool. The cutting operation includes directing a pressurized stream of abrasive fluid at a wellbore surface. The abrasive fluid comprises the carrier fluid selected at block 506 with the soluble abrasive particles selected at block 504 entrained or suspended in the carrier fluid. The pressurized stream may be created by a pump coupled to the soluble abrasive cutting tool. The pump may be local to the tool, or it may be at a surface of the wellbore and coupled to the tool via tubing.

Various types of operations may be performed. For example, in some aspects, perforations may be cut into a casing in order to allow production fluids to flow into the casing from a surrounding formation. In other aspects, the casing may be cut entirely in support of well abandonment operations. In further alternative aspects, the cutting operations may be directed at built-up scale within a casing in order to remove the scale from the surface of the casing.

Other surfaces can be the subject of the cutting operations. For example, the soluble abrasive cutting tool can perform cutting operations on surface of a rock formation in the wellbore. Cutting operations can be performed on a plug in the wellbore.

Various aspects of the cutting operation may be directed by a control system. For example, a control system may determine a tilt of the tool with respect to the wellbore or casing. Additionally, the control system can control the opening and closing of nozzles on the soluble abrasive cutting tool and may control the focus of the nozzles. Further, the control system may control a rotation of the tool during cutting operations. For example, if the casing is to be cut across entirely, the control system may rotate the tool as it performs cutting operations. The control system may determine a duration of the cutting operation based on the surface to be cut and the size and type of abrasive particles used in the abrasive fluid.

After the operations of blocks 502-510 have been performed, the cutting operations may be complete. Operations 514 and 516 can be performed after completion of cutting operations.

At block 514, a waiting time is determined based on the wellbore fluid and soluble abrasive particles used in the cutting operations. The waiting time is determined based on the amount of time required for the soluble abrasive particles to substantially completely dissolve in the wellbore fluid. For example, the waiting time can be based on the volume of particles, the temperature at the location of the cutting operations, and the solubility of the particles in the wellbore fluid. In some embodiments, a solubility enhancer can be added to the wellbore fluid to improve the solubility of the abrasive particles in the wellbore fluid. For example, a fluid can be selected that is compatible with the wellbore fluid (e.g., does not react adversely with the wellbore fluid) and in which abrasive particles are soluble. The selected fluid can be pumped into the wellbore to accelerate the dissolving of the abrasive particles in the wellbore.

At block 516, the wellbore fluid is pumped out of the wellbore, thereby removing an dissolved abrasive particles from the wellbore.

Example Computer Device

Figure 6:
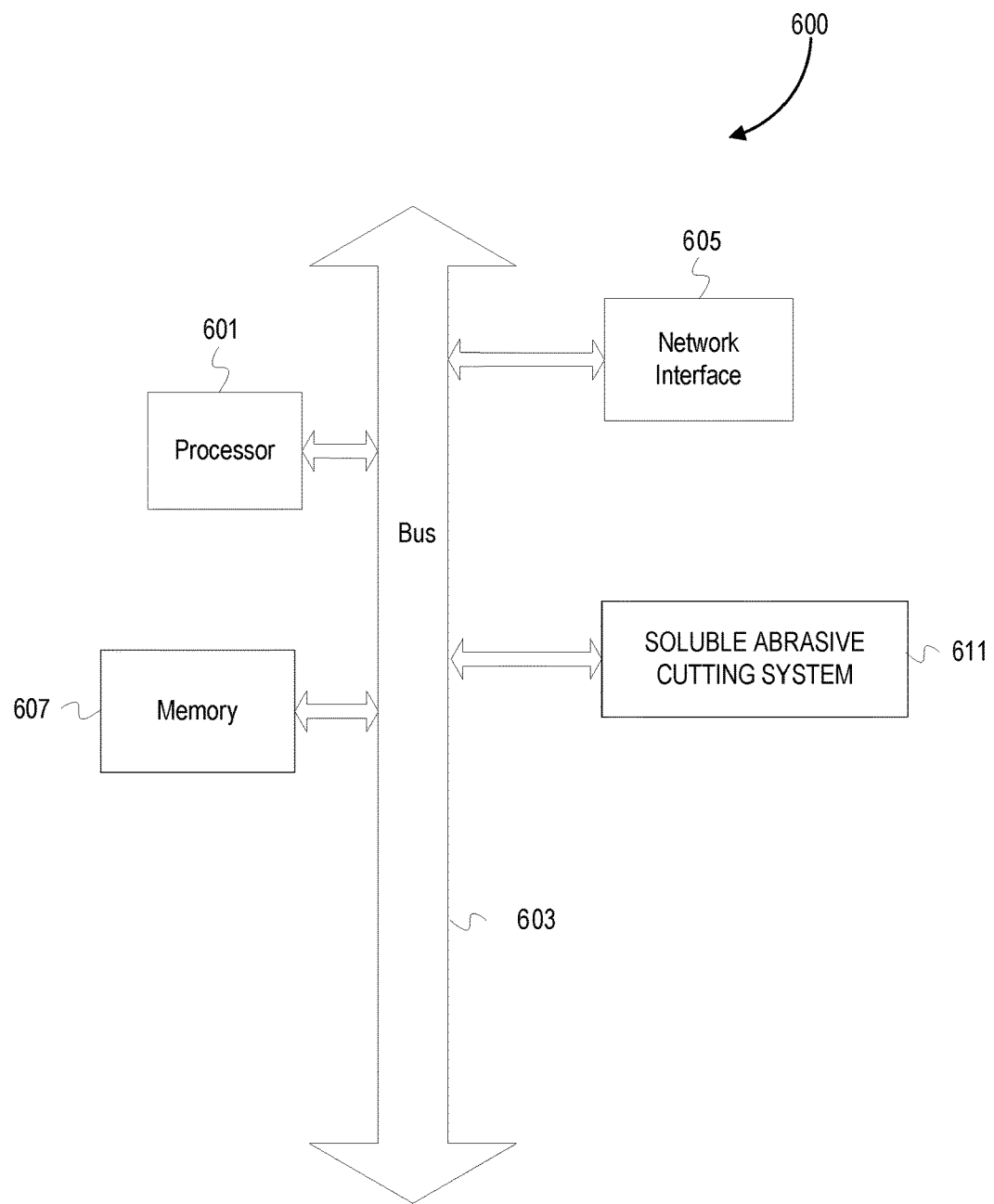
FIG. 6 depicts an example computer, according to some embodiments.

FIG. 6 depicts an example computer, according to some embodiments. A computer device 600 includes a processor 601 (possibly including multiple processors, multiple cores, multiple nodes, and/or implementing multi-threading, etc.). The computer device 600 includes a memory 607. The memory 607 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The memory 607 can be used as a buffer. The computer device 600 also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.).

In some embodiments, the computer device 600 includes a soluble abrasive cutting system 611. With respect to FIG. 5, the soluble abrasive cutting system 611 can perform one or more the operations described above in the flowchart 500. For example, the soluble abrasive cutting system 611 can determine a depth at which a cutting tools is to be deployed, determine a pressure for a stream of soluble abrasive particles, and determine a timing for the cutting operations. Any one of the previously described functionalities can be partially (or entirely) implemented in hardware and/or on the processor 601. For example, the functionality can be implemented with an application specific integrated circuit, in logic implemented in the processor 601, in a co-processor on a peripheral device or card, etc. Further, realizations can include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 can be coupled to the processor 601. The computer device 600 can be integrated into component(s) of a pipe downhole and/or be a separate device at the surface that is communicatively coupled to the bottom hole assembly (BHA) downhole for controlling and processing signals (as described herein).

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit," "module" or "system." The functionality presented as individual modules/ units in the example illustrations can be organized differently in accordance with any one of platform (operating system and/or hardware), application ecosystem, interfaces, programmer preferences, programming language, administrator preferences, etc.

Any combination of one or more machine-readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Additional Terminology and Variations

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. Use of the term "set" can be treated as meaning "group having at least one of." For example, "set of items" can be treated as meaning "group of items having at least one item."

EXAMPLE EMBODIMENTS

Example embodiments include the following:

Embodiment 1

A method comprising: determining a wellbore fluid in a wellbore; determining a soluble abrasive based, at least in part on the wellbore fluid; deploying a tool into the wellbore, the tool having at least one nozzle; and performing a cutting operation in the wellbore, the cutting operation comprising directing, via the nozzle, a pressurized stream of the soluble abrasive at a surface in the wellbore to cause a change in the surface.

Embodiment 2

The method of embodiment 1, further comprising determining a carrier fluid for the soluble abrasive.

Embodiment 3

The method of embodiment 2, wherein the soluble abrasive is at least partially soluble in the wellbore fluid and substantially insoluble in the carrier fluid.

Embodiment 4

The method of any of embodiments 1-3, wherein the soluble abrasive comprises a magnesium alloy.

Embodiment 5

The method of any of embodiments 1-4, wherein the wellbore fluid comprises a saltwater brine.

Embodiment 6

The method of any of embodiments 1-5, wherein determining the soluble abrasive comprises determining the soluble abrasive based, at least in part, on a type of material of the surface in the wellbore.

Embodiment 7

The method of any of embodiments 1-6, further comprising determining a particle size of the soluble abrasive in accordance with the cutting operation.

Embodiment 8

The method of any of embodiments 1-7, wherein the cutting operation comprises cutting a perforation in a casing in the wellbore.

Embodiment 9

The method of any of embodiments 1-8, wherein the cutting operation comprises cutting a material deposited on a casing in the wellbore away from the casing.

Embodiment 10

The method of any of embodiments 1-9, further comprising rotating the tool during the cutting operation to cut through a casing in the wellbore.

Embodiment 11

The method of any of embodiments 1-10, further comprising: adding, after the cutting operation, a solubility enhancer to the wellbore fluid, wherein the solubility enhancer improves solubility of the soluble abrasive in the wellbore fluid.

Embodiment 12

The method of any of embodiments 1-11, further comprising: determining a time period required for the soluble abrasive to dissolve into the wellbore fluid; and removing the wellbore fluid containing the soluble abrasive after the time period has elapsed after the cutting operation.

Embodiment 13

An apparatus comprising: a pump; and a cutting tool coupled to the pump, the cutting tool comprising one or more nozzles, wherein the cutting tool is configured to:

receive a carrier fluid including a soluble abrasive suspended in the carrier fluid, and direct, via the one or more nozzles, a pressurized stream of the carrier fluid comprising the soluble abrasive at a surface in a wellbore to perform a cutting operation on the surface in the wellbore.

Embodiment 14

The apparatus of embodiment 13, wherein a wellbore fluid in the wellbore comprises a saltwater brine.

Embodiment 15

The apparatus of any of embodiments 13-14, wherein the soluble abrasive is at least partially soluble in a wellbore fluid at a location of the cutting operation and substantially insoluble in the carrier fluid.

Embodiment 16

The apparatus of any of embodiments 13-15, wherein the soluble abrasive comprises a magnesium alloy.

Embodiment 17

The apparatus of any of embodiments 13-16, wherein the cutting operation comprises cutting a perforation in a casing in the wellbore.

Embodiment 18

The apparatus of embodiment 17, wherein the one or more nozzles are configured in a perforation pattern.

Embodiment 19

The apparatus of any of embodiments 13-18, wherein the cutting operation comprises cutting a material deposited on a casing in the wellbore away from the casing.

Embodiment 20

The apparatus of any of embodiments 13-19, wherein the pump is coupled to the cutting tool via a work string disposed in the wellbore.

What is claimed is:

1. A method comprising:
   determining, by a control system, abrasive particles that are at least partially soluble in a wellbore fluid;
   determining, by the control system, a size of the abrasive particles based, at least in part, on an operation to be performed in a wellbore;
   determining, by the control system, a carrier fluid in which the abrasive particles are substantially insoluble;
   creating a mixture including the determined abrasive particles and the determined carrier fluid;
   pumping the created mixture into the wellbore, wherein the wellbore contains the wellbore fluid;
   determining, by the control system, a waiting time to remove, from the wellbore, the wellbore fluid into which the abrasive particles have substantially dissolved based, at least in part, on the size of the abrasive particles; and
   removing the wellbore fluid from the wellbore after the waiting time.

2. The method of claim 1, wherein the abrasive particles comprise a magnesium alloy.

3. The method of claim 1, wherein the wellbore fluid comprises a saltwater brine.

4. The method of claim 1, further comprising:
   after pumping the created mixture into the wellbore, adding a solubility enhancer to the wellbore, wherein the solubility enhancer increases solubility of the abrasive particles.

5. The method of claim 1, further comprising:
   directing a pressurized stream of the created mixture at a surface in the wellbore.

6. The method of claim 5, wherein determining the abrasive particles further comprises determining the abrasive particles based, at least in part, on the surface in the wellbore.

7. The method of claim 5, wherein directing the pressurized stream of the created mixture at the surface comprises cutting a perforation in a casing in the wellbore.

8. The method of claim 5, wherein directing the pressurized stream of the created mixture at the surface comprises abrading the surface.

9. The method of claim 5, wherein directing the pressurized stream of the created mixture at the surface further comprises rotating the pressurized stream directed at the surface, and wherein rotating the pressurized stream directed at the surface comprises cutting through a casing in the wellbore.

10. The method of claim 1, wherein determining the carrier fluid further comprises determining a carrier fluid that does not adversely react with the wellbore fluid.

11. The method of claim 1, further comprising determining at least one of a temperature and pressure in the wellbore, wherein determining the abrasive particles comprises determining the abrasive particles based, at least in part, on the at least one of the temperature and pressure, and wherein determining the carrier fluid comprises determining the carrier fluid based, at least in part, on the at least one of the temperature and pressure.

12. The method of claim 1, wherein the operation comprises at least one of a cutting operation, a perforation operation, a cleaning operation, or a deposited material removal operation.

13. A non-transitory, machine-readable medium having instructions stored thereon that are executable by a computing device, the instructions to:
   select abrasive particles that are at least partially soluble in a wellbore fluid in a wellbore;
   select a size of the abrasive particles based, at least in part, on a removal operation to be performed;
   select a carrier fluid in which the abrasive particles are substantially insoluble;
   indicate a mixture that includes the selected abrasive particles and the selected carrier fluid;
   control the removal operation, wherein the instructions to control the removal operation comprise instructions to:
      pump the mixture into the wellbore;
      direct via a nozzle a pressurized stream of the mixture at a surface in the wellbore to abrade the surface;
      determine a waiting time to remove, from the wellbore, the wellbore fluid into which the abrasive particles have substantially dissolved based, at least in part, on the size of the abrasive particles, and
      remove the wellbore fluid from the wellbore after the waiting time.

14. The non-transitory, machine-readable medium of claim 13, further comprising instructions to:
   determine a solubility enhancer based, at least in part, on the wellbore fluid and the abrasive particles; and wherein the instructions to control the removal operation further comprise instructions to add the solubility enhancer to the wellbore after the abrasion of the surface.

15. The non-transitory, machine-readable medium of claim 13, wherein the instructions to control the removal operation comprise instructions to control at least one of a cutting operation, a perforation operation, a cleaning operation, and a deposited material removal operation.

16. The non-transitory, machine-readable medium of claim 13, wherein the instructions to control the removal operation comprise instructions to control a cutting tool, wherein the cutting tool comprises the nozzle.

17. The non-transitory, machine-readable medium of claim 16, wherein the instructions to control the cutting tool comprise instructions to control a depth of the cutting tool.

* * * * *